United States Patent
Jeong

(10) Patent No.: US 7,750,499 B2
(45) Date of Patent: Jul. 6, 2010

(54) DEVICE FOR LIMITING CURRENT OF ELECTRIC APPLIANCE

(75) Inventor: Byung Jo Jeong, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 12/091,379

(22) PCT Filed: Nov. 22, 2006

(86) PCT No.: PCT/KR2006/004923

§ 371 (c)(1),
(2), (4) Date: Apr. 24, 2008

(87) PCT Pub. No.: WO2007/061219

PCT Pub. Date: May 31, 2007

(65) Prior Publication Data

US 2008/0217997 A1    Sep. 11, 2008

(30) Foreign Application Priority Data

Nov. 22, 2005  (KR) .................. 10-2005-0111802
Nov. 22, 2005  (KR) .................. 10-2005-0111803

(51) Int. Cl.
H02J 3/14    (2006.01)

(52) U.S. Cl. .......................... 307/31; 307/29

(58) Field of Classification Search ............. 307/29, 307/31
See application file for complete search history.

(56) References Cited

U.S. PATENT DOCUMENTS 7,621,012 B2 * 11/2009 Kim ........................ 8/147

FOREIGN PATENT DOCUMENTS

JP    2001-231266    8/2001
JP    2002-010472    1/2002

OTHER PUBLICATIONS

International Search Report dated Feb. 26, 2007.

* cited by examiner

*Primary Examiner*—Robert L. DeBeradinis
(74) *Attorney, Agent, or Firm*—Ked & Associates, LLP

(57) ABSTRACT

Provided is a device for limiting a current of electric appliance. The current limiting device includes: at least two loads; at least two load driving units connected to the loads to control applying power to the loads; a power detecting unit detecting a power type; a micom controlling the load driving unit according to the power type detected by the power detecting unit to drive the load using a current flowing into the load within an allowable value; and at least one current limiting unit connected to at least one control line connecting the micom and the load driving unit and limiting a current of the load driving unit connected to the control line when the micom malfunctions by using a control signal of the micom and a signal of the power type detected from the power detecting unit as an input signal.

20 Claims, 2 Drawing Sheets

DEVICE FOR LIMITING CURRENT OF ELECTRIC APPLIANCE

TECHNICAL FIELD

The present invention relates to a device for limiting a current of electric appliance, and more particularly, to a device for limiting a current of electric appliance, the device more safely limiting an allowable current of electric appliance by satisfying standards according to input power types (single-phase, two-phase, and three-phase).

BACKGROUND ART

In a case of electric appliance requiring a high output, its total output is limited according to standards and power safety. That is, the total output of the electric appliance in a home power may be within an allowable current corresponding to standards of a power.

For this, after the power type is determined by detecting the connection state of a power cord of a product, the total load of electronic appliance, and the total output for the total load are limited according to standards corresponding to the power types. That is, a total current amount is limited.

More specifically, the power types may be single-phase, two-phase, and three-phase. In the two-phase, only two-phase is used in a power of the three-phase. This concept will be applied to this present invention. When the power types are different, an allowable current amount is set by standards of a power. For example, when a power cord of a product is single-phase or three-phase, an allowable current is relatively large 40 A, and when a power cord of a product is two-phase, an allowable current is 16 A. Therefore, a corresponding output needs to be within an allowable current.

Hereinafter, a heater for cooking appliance will be used as an example to illustrate a related art device for limiting a current.

The related art device for limiting a current includes a power detecting unit sensing input a power type (i.e., single-phase, two-phase, or three-phase) connected to a power cord, a relay connected to the heater in a one-to-one correspondence to switch a corresponding heater, and a micom controlling on/off of the relay to selectively operate the heater according to a power type detected in the power detecting unit.

Further more, although the power cord is two-phase, the micom limits the operation of the heater for safety of an input power and electric appliance when a user operates the heater to exceed a total allowable current amount and also operational conditions are inputted to exceed a total allowable current amount. The micom limits the operation of the heater in an aspect of software.

However, when only the micom limits a total output according to standards of a power, a current suddenly may exceed an allowable current in a case of micom malfunction. Therefore, a circuit breaker is turned on or a fire due to a power cord overheating occurs. That is, safety accident may occur. Since there is no preparation for a micom malfunction, safety and reliability of a system deteriorate.

DISCLOSURE OF INVENTION

Technical Problem

An object of the present invention is to provide a current limiting device safely limiting an allowable current inputted into electric appliance.

Another object of the present invention is to provide a current limiting device limiting an allowable current according to power standards when a micom malfunctions.

Technical Solution

To achieve these objects and other advantages and in accordance with the purpose of the invention, as embodied and broadly described herein, there is provided a current limiting device including: at least two loads; at least two load driving units connected to the loads to control applying power to the loads; a power detecting unit detecting a power type; a micom controlling the load driving unit according to the power type detected by the power detecting unit to drive the load using a current flowing into the load within an allowable value; and at least one current limiting unit connected to at least one control line connecting the micom and the load driving unit and limiting a current of the load driving unit connected to the control line when the micom malfunctions by using a control signal of the micom and a signal of the power type detected from the power detecting unit as an input signal.

In another object of the present invention, there is provided a current limiting device including: at least two loads; load driving units connected to the loads respectively to drive each of the loads; a power detecting unit connected to respectively different live lines of the input power to detect a power type according to a potential difference between lines; a micom controlling a load driving unit according to the power type detected by the power detecting unit and driving the load to make an allowable current not to exceed a standard value; and a current limiting unit limiting a part of the loads to make an allowable current not to exceed a standard value by receiving the power type detected from the power detecting unit and a control signal of the load driving unit outputted from the micom.

In another object of the present invention, there is provided a current limiting device including: at least two loads; load driving units connected to the loads respectively to drive each of the loads; a first power detecting unit connected to each of lines in a first combination having a pair of live lines of an input voltage to detect a potential difference between lines; a second power detecting unit connected to each of lines in a second combination having a pair of live lines of an input voltage to detect a potential difference between lines, and detecting a power type according to the detection results of the first and second power sensing units; a micom controlling a load driving unit according to the power type detected by the second power detecting unit and driving the load to make an allowable current not to exceed a standard value; and a current limiting unit limiting a part of the loads to make an allowable current not to exceed a standard value by receiving the power type detected from the second power detecting unit and a control signal of the load driving unit outputted from the micom.

ADVANTAGEOUS EFFECTS

According to the present invention, a current limiting device limits an allowable current according to power standards and limits a part of operations when a micom malfunctions. Consequently, since the cause of a fire is reduced, safety and reliability of electric appliance can be improved.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings.

Figure 1:
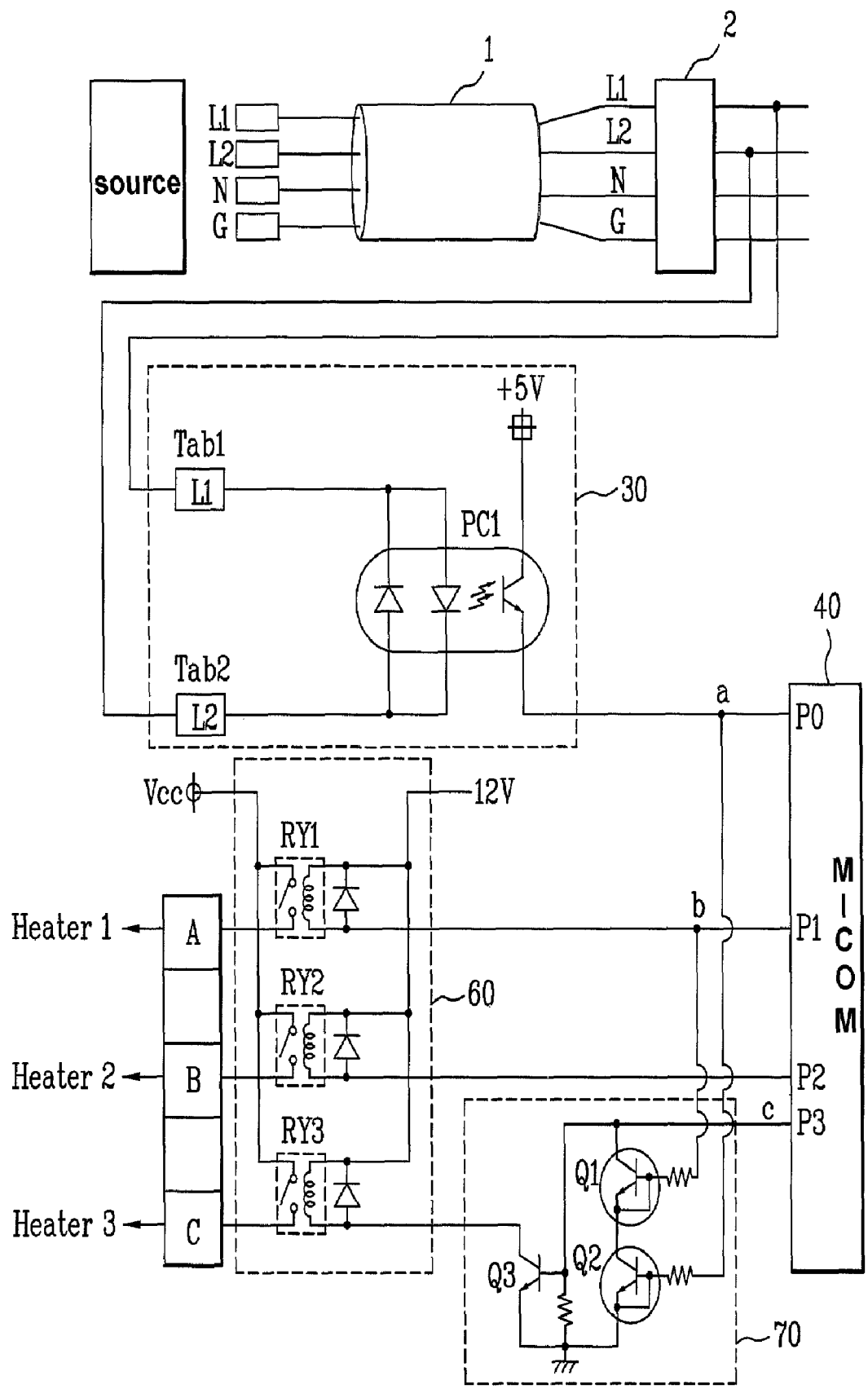
FIG. 1 is a circuit diagram of a current limiting device according to an embodiment of the present invention.

FIG. 1 is a circuit diagram of a current limiting device according to an embodiment of the present invention.

Referring to FIG. 1, a current limiting device of electric appliance includes at leas two heaters 1, 2, and 3, at least two relays RY1, RY2, and RY3 connected to the heater respectively to operate each of the heaters 1, 2, and 3, a sensing unit 31 connected to live lines L1 and L2 of a power cord 1 to sense the power types according to a potential difference of lines, a micom 40 controlling the relays RY1, RY2, and RY3 to selectively operate a heater within a standard value of an allowable current according to the power types detected through the power detecting unit 30, and a current limiting unit 70 limiting a part of heaters within a standard value of an allowable current by receiving the power types detected through the power detecting unit 30 and control signals of the relays RY1, RY2, and RY3 outputted from the micom 40.

The power detecting unit 30 includes photo couplers PC1 having input terminals connected to the live lines L1 and L2 among power lines from a terminal block 2 and being turned off/on according to a potential difference between the lines. The photo coupler PC1 includes an output terminal connected to an input port P0 of the micom 40, and outputs a low signal by detecting a single-phase power when a voltage between the live lines L1 and L2 has the same electric potential and a high signal by detecting a two-phase power when a voltage between the live lines L1 and L2 is different.

The micom 40 determines the power types according to a signal of the photo coupler PC1. The signal is inputted through an input port P0. More specifically, in a case of single-phase, a heater operates without limitation for a total output, and in a case of two-phase, a heater is limited not to exceed a standard value of an allowable current. In the two-phase, only two-phase is used in a power of the three-phase.

The micom 40 determines an operation of a heater according to external driving conditions and the power types, and then outputs a high signal or a low signal into the relays RY1, RY2, and RY3. The relay receiving the high signal from the micom 40 starts an operation of a corresponding heater, and the relay receiving the low signal from the micom 40 is turned off and stops an operation of a corresponding heater.

In a case of external driving conditions that make all heaters operate, the micom 40 outputs high signals into the relays RY1, RY2, and RY3. However, when the power types detected from a power sensing unit 30 is two-phase, the micom 40 outputs a low signal into a corresponding relay to limit a part of the heaters in spite of the external driving conditions. However, although the micom 40 needs to limit the heaters and a power is two-phase, the heaters may not be limited due to the malfunction of the micom 40.

The current limiting device driven for the above case will be described in more detail.

Figure 2:
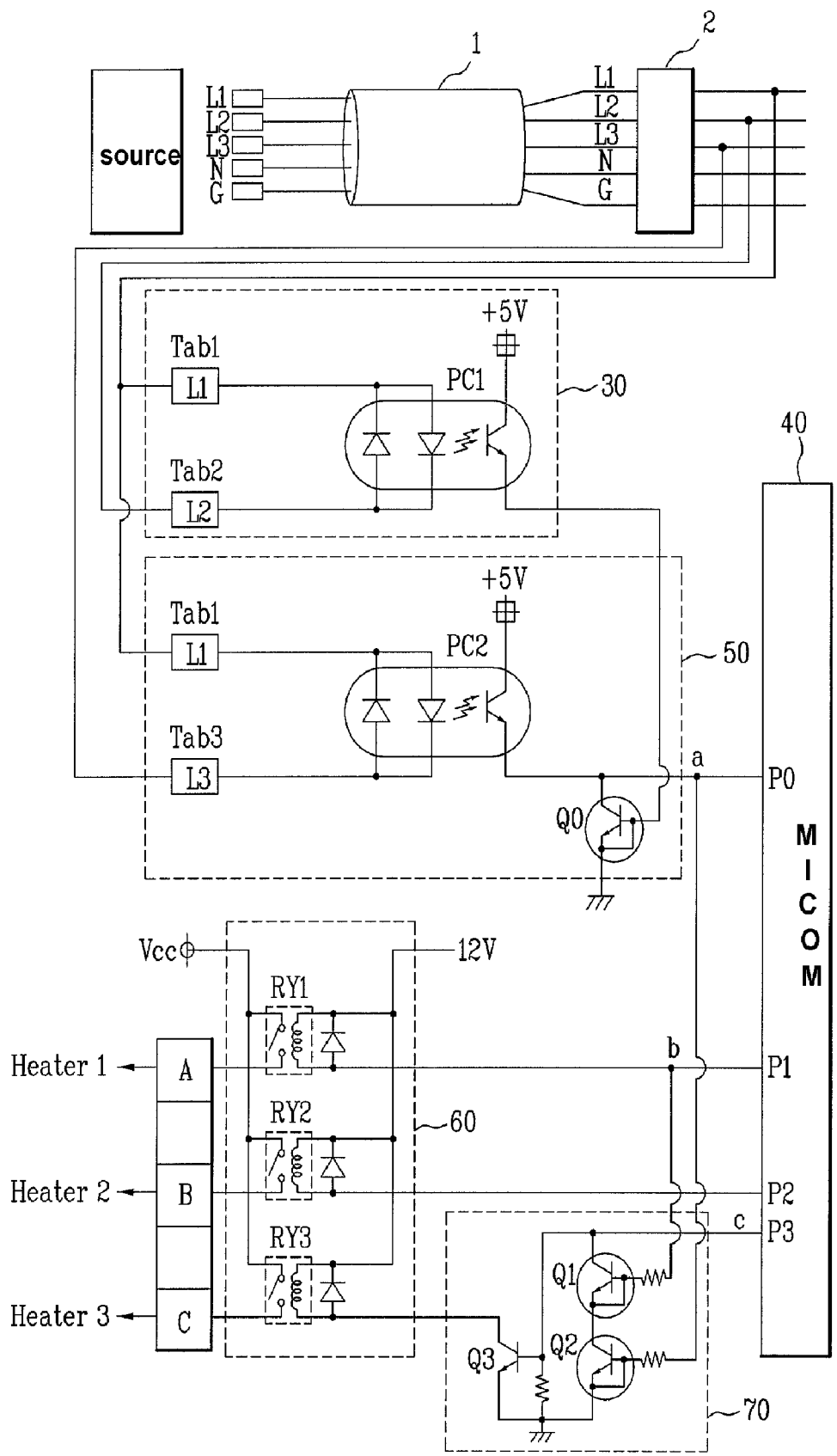
FIG. 2 is a circuit diagram of a current limiting device according to another embodiment of the present invention.

The current limiting unit 70 is connected to one input terminal of the relays RY1, RY2, and RY3 to limit a part of heaters for preparation of the malfunction of the micom 40 by considering an output signal of the power detecting unit 70 and the relay drive signal of the micom 40 simultaneously. Referring to FIG. 2, the current limiting unit 70 is connected to the third relay RY3, but the present invention is not limited to this. However, the relay connected to the current limiting unit 70 needs to be maintained below an allowable current value when being turned off by the current limiting unit 70.

When the current limiting unit 70 is connected to an input terminal of the third relay RY3, in a connection state of a first transistor Q1, a base is one of output ports P1, P2, and P3 of the micom 40 for the relays RY1, RY2, and RY3, and a collector is connected to an output port P3 connected to the relay RY3.

In a connection state of a second transistor Q2, a base is connected to an output terminal of the power detecting unit 30, a collector is connected to an emitter of the first transistor Q1, and an emitter is connected to a ground terminal.

In a connection state of a second transistor Q3, a base is commonly connected to a collector and a ground terminal of the first transistor Q1, an emitter is connected to a ground terminal, and a collector is connected to an output terminal of the relay RY3.

At this point, the first, second, and third transistors Q1, Q2, and Q3 are an npn-type transistor. The first and second transistors Q1 and Q2 include an emitter terminal and a base terminal connected commonly, respectively.

According to a structure of the current limiting unit 70, the first transistor Q1 includes a relay drive signal outputted from the output port P1 of the micom 40 as a base input signal b, and the second transistor Q2 includes an output signal a of the power detecting unit 30 as a base input signal.

In these connection states, when at least one among base input signals of the first and second transistors Q1 and Q2 is a low signal, a line connected to the first and second transistors Q1 and Q2 is opened. Therefore, a drive signal c of the micom 40 outputted into the relay RT3 is delivered as an input signal of the relay RY3 through the third transistor Q3.

This means that a single-phase power is detected from the power detecting unit 30, or the micom 40 does not operate one heater. Therefore, the current limiting unit 70 does not need to limit the relay drive signal c for a heater outputted from the output port P3 of the micom 40.

On the other hand, when the base input signals of the first and second transistors Q1 and Q2 are high signals, they are turned on simultaneously to form a closed circuit for a ground terminal, and then the drive signal c of the micom 40 for the relay RY3 flows into a ground terminal and disappears.

Moreover, when a two-phase power is detected in the power detecting unit 30, the micom 40 limits a part of the heaters. However, when a high signal is outputted from the output port P1 and a high signal is outputted from an output port P3 connected to a current limiting unit 70 simultaneously, the first and second transistors Q1 and Q2 are simultaneously turned on to bypass the high signal outputted from the output port P3 into a ground terminal. When a two-phase power is detected and high signals are outputted simultaneously through two output ports P1 and P3 of the micom 40, it means that the micom 40 malfunctions. Therefore, the signal c of the output port P3 connected to the current limiting unit 70 is forcefully shutdown.

Accordingly, when all heaters are driven in a case of a two-phase power, a total output exceeds an allowable current. Thus, the micom 40 primarily limits the operations of the heaters. When all heaters are driven due to the malfunction of the micom 40, reliability of limiting a current can be improved by using the current limiting unit 70 to directly limit a part of the heaters.

The connection state of the current limiting unit 70 can be understood also when a base of the first transistor Q1 is connected to an output port P2.

Moreover, when a forth transistor Q4 is formed to connect in serial to the first and second transistors Q1 and Q2 and includes an output port P2 connected to a base terminal, it operates in the same way. However, since the current limiting unit 70 deals with the rarely occurring malfunction of the micom 40, it is unnecessary to further form the fourth transistor Q4, and also there is no operation error without the forth transistor Q4.

When the current limiting device of electric appliance provides a current limiting circuit that limits an allowable current according to a power standard, it additionally adds a device limiting an operation of heaters forcefully even though the malfunction of the micom 40 occurs. Therefore, safety and reliability of the product can be improved.

The above embodiment illustrates a case of single-phase and two-phase powers, and can not be applied to a product of a three-phase power as it is. A current limiting device that can be applied to a product of a three-phase power will be described. However, since the idea of the three-phase power is mostly identical to that of the above embodiment, only a different portion will be described for conciseness, and the components without a detailed description are identical to those of the above embodiment.

FIG. 2 is a circuit diagram of a current limiting device according to another embodiment of the present invention.

Referring to FIG. 2, to accurately detect a three-phase power, a power detecting unit includes a first power detecting unit 30 connected to first and second live lines L1 and L2 of an input power and detecting a potential difference between the lines, and a second power detecting unit 50 connected to first and third live lines L1 and L3 of an input power and detecting a potential difference between lines. Additionally, the second power detecting unit detects the power types according to the detection results of the first and second power detecting units.

Here, the first power detecting unit 30 includes photo couplers PC1 having input terminals connected to the live lines L1 and L2 among power lines from a terminal block 2 and being turned off/on according to a potential difference between the lines. The second power detecting unit 50 includes photo couplers PC2 having input terminals connected to the live lines L1 and L3 among power lines from a terminal block 2 and being turned off/on according to a potential difference between the lines, and includes a transistor Q0. The transistor Q0 includes a base connected to an output terminal of the first photo coupler PC1 in the first power detecting unit 30, an emitter connected to a ground terminal, and a collector connected to an output terminal of the second photo coupler PC2.

At this point, the second photo coupler PC2 has an output terminal connected to an input port P0 of the micom 40.

According to this structure, the first photo coupler PC1 outputs a low signal when a voltage between the first and second live lines L1 and L2 has the same electric potential, and outputs a high signal when a voltage between the first and second live lines L1 and L2 has different electric potentials.

At this point, an output signal of the first photo coupler PC is applied into a base input signal of the transistor Q0. The npn-type transistor Q0 is turned off when a low signal is applied and turned on when a high signal is applied.

More specifically, when an input power is a three-phase power, high signals are outputted from the first and second photo couplers PC1 and PC2 to turn on the transistor of the second power detecting unit 40. Thus, a low signal is inputted into an input port P0 of the micom 40. In a case of a single-phase power, low signals are outputted from the first and second photo couplers PC1 and PC2 such that the second power detecting unit 50 outputs a low signal into the micom 40. Additionally, when an input power is a two-phase power using two phase among three phase (let assume that the first and second live lines L1 and L2 are short), a low signal is outputted from the first photo coupler PC1, and a high signal is outputted from the photo coupler PC2. At this point, the transistor Q0 of the second power detecting unit 40 is turned on to output a high signal of the second photo coupler PC2 into the micom 40.

Again, when receiving a low signal through an input port P0, the micom 40 determines the low signal as a single-phase or three-phase power, and when receiving a high signal through an input port P0, the micom 40 determines the high signal as a two-phase power.

The micom 40 determines the input power types according to signal inputted through the input port P0, and then determines operations of the heater. In a case of a single or three phase power, the heaters are driven without limitation for a total output, and in a case of a two-phase power, the heaters are driven within a standard value of an allowable current.

Next, operations of the micom 40 and the current limiting unit 70 are identical to those of the previous embodiment. The detailed description will be omitted for conciseness.

According to this embodiment, since a three-phase power can be detected through the power detecting units 30 and 50, the current limiting unit 70 can be operated regardless of the power types. Moreover, compatibility of a product increases since all the power types (single-phase, two-phase, and three-phase) can be applied.

In another embodiment of the present invention, the power detecting units 30 and 50 are connected to two lines to detect the same potential. However, this is a just one example, and any other forms of power detecting units, which are directly connected to a three-phase power to determine the power types, can be suggested.

Moreover, although the number of loads is three in the embodiment, the number may vary. Furthermore, although the number of current limiting units is one, the present invention is not limited to this.

INDUSTRIAL APPLICABILITY

The present invention provides a current limiting device that limits an allowable current according to a power standard to forcefully limit a part of loads when the malfunction of the micom occurs. Therefore, the safety and reliability of electric appliance can be improved.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A current limiting device comprising:
   at least two loads;
   at least two load driving units connected to the loads to control applying power to the loads;
   a power detecting unit detecting a power type;
   a micom controlling the load driving unit according to the power type detected by the power detecting unit to drive the load using a current flowing into the load within an allowable value; and
   at least one current limiting unit connected to at least one control line connecting the micom and the load driving unit, and limiting a current of the load driving unit connected to the control line when the micom malfunctions, by using a control signal of the micom and a signal of the power type detected from the power detecting unit as an input signal.

2. The device according to claim 1, wherein the power detecting unit comprises two input terminals, the two input terminals connected to respectively different power lines to compare an electric potential and determine a power type.

3. The device according to claim 1, wherein a number of power lines of the input power is three, and the input terminals of the power detecting unit are connected to the two respectively different power lines.

4. The device according to claim 1, wherein the load driving unit is a relay.

5. The device according to claim 1, wherein the micom drives all the loads when the input power is one of single-phase and three-phase, and does not drive all the loads when the input power is two-phase.

6. The device according to claim 1, wherein the loads are heaters.

7. The device according to claim 1, wherein the current limiting unit bypasses a control signal of the micom by a plurality of transistors connected in serial having the input signal connected to a base thereof.

8. The device according to claim 1, wherein the power detecting unit identifies a two-phase power using two-phase among three-phase power.

9. A current limiting device comprising:
at least two loads;
load driving units connected to the loads respectively to drive each of the loads;
a power detecting unit connected to respectively different live lines of the input power to detect a power type according to a potential difference between lines;
a micom controlling a load driving unit according to the power type detected by the power detecting unit and driving the load to make an allowable current not to exceed a standard value; and
a current limiting unit limiting a part of the loads to make an allowable current not to exceed a standard value by receiving the power type detected from the power detecting unit and a control signal of the load driving unit outputted from the micom.

10. The device according to claim 9, wherein the power detecting unit comprises a photo coupler PC1 turned on/off according to a potential difference between the live lines.

11. The device according to claim 9, wherein the current limiting unit is connected to at least one of the load driving units to control an output of a corresponding load driving unit.

12. The device according to claim 9, wherein the current limiting unit comprises:
a first transistor Q1 including a base connected to one of output ports of micom connected to the load driving unit, and collector connected to the other one of the output ports of the micom;
a second transistor Q2 including a base connected to an output terminal of the power detecting unit, a collector connected to the emitter of the first transistor Q1, and an emitter connected to a ground terminal; and
a third transistor Q3 including a base commonly connected to the collector and the ground terminal of the first transistor Q1, an emitter connected to the ground terminal, and a collector connected to an input terminal of the load driving unit.

13. The device according to claim 12, wherein the first, second, and third transistors are an npn type transistor, and the first and second transistors comprises emitter and base terminals connected in common.

14. A current limiting device comprising:
at least two loads;
load driving units connected to the loads respectively to drive each of the loads;
a first power detecting unit connected to each of lines in a first combination having a pair of live lines of an input voltage to detect a potential difference between lines;
a second power detecting unit connected to each of lines in a second combination having a pair of live lines of an input voltage to detect a potential difference between lines, and detecting a power type according to the detection results of the first and second power sensing units;
a micom controlling a load driving unit according to the power type detected by the second power detecting unit and driving the load to make an allowable current not to exceed a standard value; and
a current limiting unit limiting a part of the loads to make an allowable current not to exceed a standard value by receiving the power type detected from the second power detecting unit and a control signal of the load driving unit outputted from the micom.

15. The device according to claim 14, wherein the power detecting unit comprises a photo coupler turned on/off according to a potential difference between the liens of the first combination.

16. The device according to claim 14, wherein the second power detecting unit comprises:
a second photo coupler PC2 turned on/off according to a potential difference between the liens of the second combination; and
a transistor Q0 including a base connected to an output terminal of the first power detecting unit, an emitter connected to a ground terminal, and a collector connected to an output terminal of the second photo coupler PC2.

17. The device according to claim 14, wherein the current limiting unit is connected to one of the load driving units to control an output of a corresponding load driving unit.

18. The device according to claim 14, wherein the current limiting unit comprises:
a first transistor Q1 including a base connected to one of output ports of micom connected to the load driving unit, and collector connected to the other one of the output ports of the micom;
a second transistor Q2 including a base connected to an output terminal of the power detecting unit, a collector connected to the emitter of the first transistor Q1, and an emitter connected to a ground terminal; and
a third transistor Q3 including a base commonly connected to the collector and the ground terminal of the first transistor Q1, an emitter connected to the ground terminal, and a collector connected to an input terminal of the load driving unit.

19. The device according to claim 18, wherein the first, second, and third transistors are an npn-type transistor, and the first and second transistors comprises emitter and base terminals connected in common.

20. The device according to claim 14, wherein the second power detecting unit outputs an output signal according to one of single-phase and three-phase, or two-phase.

* * * * *